United States Patent
Catt et al.

(10) Patent No.: US 7,268,910 B2
(45) Date of Patent: Sep. 11, 2007

(54) JUST-IN-TIME RASTER IMAGE ASSEMBLY

(75) Inventors: Jeremy C. Catt, Windham, MA (US); Jeanne Lucivero, Burlington, MA (US); Frank P. White, Woburn, MA (US)

(73) Assignee: Agfa Corporation, Wilmington, MA (US)

(*) Notice: Subject to any disclaimer, the term of this patent is extended or adjusted under 35 U.S.C. 154(b) by 628 days.

(21) Appl. No.: 09/858,807

(22) Filed: May 16, 2001

(65) Prior Publication Data

US 2002/0171871 A1    Nov. 21, 2002

(51) Int. Cl.
*H04N 1/46*    (2006.01)
*G06K 1/00*    (2006.01)
*G06F 15/00*    (2006.01)

(52) U.S. Cl. .............. 358/1.18; 358/1.17; 358/537; 358/538; 358/540

(58) Field of Classification Search ............ 358/1.17, 358/1.18, 3.23, 450, 540, 537, 538; 382/112
See application file for complete search history.

(56) References Cited

U.S. PATENT DOCUMENTS

| | | | |
|---|---|---|---|
| 5,544,290 A * | 8/1996 | Gentile | 358/1.16 |
| 5,959,744 A * | 9/1999 | Kohri et al. | 358/450 |
| 5,964,156 A * | 10/1999 | Smith et al. | 101/471 |
| 6,222,637 B1 * | 4/2001 | Ito et al. | 358/1.18 |
| 6,441,920 B1 | 8/2002 | Smith | |
| 2001/0050998 A1 * | 12/2001 | Firan et al. | 382/112 |

FOREIGN PATENT DOCUMENTS

EP    1026876    8/2000

* cited by examiner

*Primary Examiner*—Douglas Q. Tran
*Assistant Examiner*—James A. Thompson
(74) *Attorney, Agent, or Firm*—Robert A. Sabourin

(57) ABSTRACT

A print drive is present in an electronic pre-press workflow that includes a raster image processor ("RIP") and an output device to receive, store, combine and transmit raster data processed by the raster image processor. A prepress imposition scheme is created at the front end and processed by the RIP. Prepress imposition parameters are used to generate a press sheet template image, which is transmitted to the print drive. The print drive is capable of applying the press sheet template to page raster data on demand to form a multi-page press sheet assembly so that raster images of individual pages remain independent. Among other benefits, this improves electronic prepress workflow by eliminating the need to generate combined raster images of multi-page press sheets to correct or modify a portion of the assembly.

2 Claims, 11 Drawing Sheets

PRIOR ART  FIG. 1

| Sep. Parameter | Meaning |
| --- | --- |
| Page Number (510) | Document page number |
| Sheet Number (511) | Number of the sheet the page belongs to |
| Side (512) | Side (front or back) of the sheet the page belongs to |
| Left/TopOffset (513) | Offset of raster edge to finished page (page and raster) |
| PageWidth/PageHeight (514) | Size of the finished page to be imposed (excluding bleeds) |
| BleedLeft/RightOffset (515) | Bleed sizes (prior to rotation) to apply in X direction |
| BleedTop/BottomOffset (516) | Bleed sizes (prior to rotation) to apply in Y direction |
| Rotation (517) | Angle of rotation to be applied to page before positioning |
| Mirroring (518) | Mirroring to be applied to image before insertion into flat |
| Polarity (519) | Polarity to be applied to raster before insertion into flat |

FIG. 5

| Job Parameterr | Meaning |
| --- | --- |
| Job Work Style (650) | Work Style (work & turn etc.) |
| Target Engine (651) | Target imaging device, Galileo, Avantra 44 etc. |
| Target Media (652) | Plate type and size, film size |
| Target Resolution (653) | Resolution in DPI to be used when imaging |
| Press Profile (654) | Name of profile for target press (color information etc.) |
| FastScanOffset (655) | Raster offset (prior to rotation) in fast scan direction |
| SlowScanOffset (656) | Raster offset (prior to rotation) in slow scan direction |
| PressSheetTopOffset (657) | Top offset from raster edge to press sheet area |
| PressSheetLeftOffset (658) | Left offset from raster edge to press sheet area |
| PressSheetHeight (659) | Height of the Press Sheet job is intended for |
| PressSheetWidth (660) | Width of the Press Sheet job is intended for |
| Rotation (661) | Angle of rotation used to position raster, 0 unless redirected |
| Mirroring (662) | Resulting mirroring when imaged (to whole job) |
| Polarity (663) | Resulting polarity when imaged (to whole job) |

FIG. 7

JUST-IN-TIME RASTER IMAGE ASSEMBLY

TECHNICAL FIELD

The invention relates to enhancing workflow in electronic prepress and imagesetting systems. More particularly, the invention is directed towards automated systems and methods for optimizing the workflow in a prepress system.

BACKGROUND INFORMATION

Referring to FIG. 1, as known in the art of electronic prepress systems, output devices, such as imagesetters and platesetters, and, more recently, direct on-press imaging systems, have been served by a dedicated raster image processor ("RIP") connected between a front end computer ("front end") and an output device. In the prepress system of the prior art, page images 90 are designed and imposed on the front end 40.

Imposition application software electronically positions individual pages coded in a page description language onto an electronic representation of a press sheet to form a flat 95, i.e. a multi-page press sheet image. To accomplish this layout, the software combines the page description language data of individual pages and graphics files into a single page description language file and then adds cutting, folding, and other custom flat marks, thereby creating a fully-imposed flat 95. The flat 95 is transmitted to the RIP 34 for processing as a single file.

Various front-end software application programs produce output in a page description language. Page description languages, such as Postscript™ and PDF™, offered by Adobe Systems of Mountain View, Calif., allow text descriptions of large image data files to be transferred efficiently over communication lines and data networks, because page description language code is generally significantly smaller in data size than the raster data that results from the interpreted page description language code. When a page description language image file data is received by the RIP, operations such as font processing, image placement, trapping, and color separating result in a final output file, which is configured for a proofer 68, which is used to view images on paper in a simulation of the final, printed product, or another output device 46.

The raster data produced by the RIP for an imagesetter or platesetter is binary, meaning that each pixel in the image is either on or off. Color images are represented in separations. Each separation is imaged separately to the imagesetter or platesetter. The separations imaged by the output device are used to make printing plates (in the case of imagesetters) or are the printing plates themselves (in the case of platesetters).

Images generated for output by a RIP to a proofer are typically contone images (meaning that each pixel has some color value) rather than binary separations, and so the RIP output for a proofer will typically be different than the RIP output generated for an imagesetter or platesetter. Because the images are different, there is a danger of artifacts being present in the proofed image that are not present in the separations generated for a raster imaging system or vice-versa. It would be useful, therefore, to provide proof images that accurately reflect imaged separations.

If the rasterized flat 97 is submitted to the proofer 68, the proofer output is inspected. If no errors in the imposition scheme or color reproduction have been detected in the proofer output, the rasterized flat 97 is ready for output, and is transmitted again to the RIP 34 for processing for the output device 46. If a correction or other last-minute design or imposition change is necessary, the entire flat 95 is re-submitted to the RIP 34 for re-processing after the error has been corrected or the change has been made on the front end 40. The rasterized flat 97 may first be RIP-processed for the proofer 68, and the process is repeated if another error is detected.

Recent use of large-format imagesetters and platesetters goes well beyond creation of single pages. These output devices produce press size "flats" or "press sheets" in film or plate that contain four, eight, or more pages. After printing on a press, the press sheet is then cut and folded to become part of a paper document, such as a book or a magazine. Prepress imposition design of a press sheet is traditionally performed at the front end using imposition application software. This software electronically positions individual pages coded in a page description language, such as Post-Script or PDF, onto an electronic representation of a press sheet. To accomplish this layout, the imposition software combines the PostScript or PDF data of individual pages into a single PostScript or PDF file and adds cutting, folding, and other custom marks, thereby creating a multi-page press sheet image. This image is then submitted for processing by the RIP to prepare a bitmap image file for transfer to the output device. It is, thus, necessary to have all individual pages of the print job available prior to RIP-processing. Moreover, a new imposition layout must be set for every new print job, even when processing a print job with the same number of pages of the same size as the job previously processed.

The page description language code that must be interpreted to image multiple pages in one press sheet is very complex, and the resulting bitmaps are very large. As a result, the RIP may be a bottleneck in creating press sheet films and plates. RIP-processing time for complex images can require several multiples of the imaging time. RIP-processing time has a greater impact on workflow when a change is required in a complex image. This is because a change in even a part of one page on a multi-page press sheet generally requires that the RIP reprocess the entire press sheet image. The bottleneck of slow RIP speeds affects the workflow both the first time the press sheet was processed by the RIP and a second (or more) time(s) when a modified version of the press sheet image is processed.

This method is inefficient and time-consuming, because a change in even a part of one page of the flat generally requires that the RIP reprocess the entire flat. In addition, the processing of a single raster image is further complicated by the necessity of processing all of the page image data at the same time. The page description language code that must be interpreted to image multiple pages onto a single press sheet is very complex, and the resulting bitmaps are very large. As a result, RIP-processing time for complex images can be much slower than the processing of individual pages separately. The bottleneck of slow RIP speeds affects the workflow both the first time the flat 95 is processed by the RIP and then each time when a modified version of the flat is processed.

One alternative to reprocessing the entire image, when a modification to a RIP processed image is desired, has been to physically modify the film that is output by an imagesetter to make a plate. To accomplish this modification, a portion of the image to be modified is physically cut from the film, and if necessary, a correction film inserted in its place. This can be difficult to accomplish without adding imaging artifacts. More importantly, this alternative is not available with direct-to-plate technology that does not use film. This alternative is also not possible when the change required is to lay out the various pages in a flat differently so as to accommodate a different press than the one that was originally intended.

It should be noted that one goal of modern electronic prepress systems is to keep the printing press, which is a very expensive resource, as busy as possible. It would be useful, therefore, to provide a prepress imaging system that could quickly accommodate addition of pages to a pending print job, or changes to content of individual pages, imposition layout of large-format multi-page press sheets, or press configuration, without having to wait for the modified press sheet to be re-processed by the RIP. If, for example, a first press breaks or is busy, and another (second) press is available, it would be useful to quickly provide flats that are configured for the second press.

In addition, when a multi-page flat has been imaged on a proofer, it is typical to measure the size and location of the pages in the flat to verify that the pages are aligned properly for the particular printing press on which printing is intended. It may not be easy, however, to determine whether the page has been positioned on the press sheet such that the bleed areas extend sufficiently over the cut marks. The measurements differ for each flat based on the pages in the flat and the layout and press for which the flat is intended. Because this is a manual measurement process, it is time-consuming and prone to error. It would, therefore, be useful to allow for faster measurement and verification of the layout when viewing a proof image.

SUMMARY OF THE INVENTION

An object of the present invention is to provide a practical method for imaging, which enhances system productivity and flexibility. In particular, it is an object of the present invention to provide fully imposed multi-page press sheets at output time without creating cumbersome press sheet raster image files. Further, it is an object of the present invention to enable pre-output inspection of the raster image of every page separately without reproducing the multi-page press sheet. Further yet, it is an object of the present invention to enable efficient processing of late-stage job changes in the choice of imposition and press configurations without the additional step of processing a press sheet by a raster image processor.

A print drive, useful for managing workflow, is present in a pre-press workflow that includes a raster image processor ("RIP") and an output device to receive, store, combine and transmit raster data processed by the raster image processor. A prepress imposition scheme is created at the front end and processed by the RIP. Prepress imposition parameters are extracted and a press sheet template image is generated. The press sheet template is then transmitted to the print drive. The print drive is capable of applying the press sheet template data to page raster data to form a multi-page press sheet assembly on demand, that is when viewed or transmitted to the output device, so that raster images of individual pages remain independent. These capabilities improve electronic prepress workflow by eliminating the need for the RIP to generate combined raster images of multi-page press sheets.

In general, in one aspect, the invention features a method for imaging. The method includes receiving from a first RIP first page raster data of at least one of the pages of a first print job, where the first page raster data is processed by the first RIP. The method further includes receiving a press sheet template, which consists of prepress imposition data, and then on demand digitally applying the press sheet template to the first page raster data to form a first press sheet assembly.

The prepress imposition data may consist of position, sequencing, orientation, bleeds, and offset parameters for at least one page to be positioned on a press sheet and may also consist of press sheet imposition parameters. In one embodiment, the method further consists of receiving prepress imposition data from an imposition generator, extracting the position, sequencing, orientation, bleeds, and offset parameters, and the press sheet imposition parameters from the prepress imposition data, and producing the press sheet template from the prepress imposition data.

In some embodiments, the prepress imposition data is processed by a second RIP to produce the press sheet template. In one embodiment, the first RIP and the second RIP are the same RIP.

In another embodiment, the method consists of generating rasterized geometrical depiction data in response to the position, sequencing and orientation parameters, and further in response to the press sheet imposition parameters, and then digitally combining this geometrical depiction data with the press sheet template. In one embodiment, the geometrical depiction data is rule-up lines.

In yet another embodiment, the method further includes storing the press sheet template. In still another embodiment, the method also includes rendering the press sheet assembly to a destination device. The destination device may be a platesetter for imaging onto a plate, an imagesetter for imaging onto photosensitive paper and film, a printer for imaging onto paper, a storage medium for storing a file, or a press for direct on-press imaging. After rendering the press sheet assembly to the destination device, the method may further include receiving from a first RIP second page raster data of at least one of the pages of a second print job, selecting the stored press sheet template, and digitally applying the stored press sheet template to the second page raster data on demand to form a second press sheet assembly.

In general, in another aspect, the invention features a method for imaging. The method includes receiving and storing a plurality of press sheet templates. The method further includes receiving first page raster data of at least one of the pages of a first print job from a first RIP, selecting a press sheet template from the plurality of press sheet templates, and digitally applying the press sheet template to the first page raster data on demand to form a first press sheet assembly.

In general, in yet another aspect, the invention features a print drive. The print drive includes an input subsystem for receiving page raster data of at least one of the pages of a print job and for receiving a press sheet template. The print drive includes a data store for storing press sheet templates. The print drive also includes a digital press sheet assembler in communication with the storage device. The digital press sheet assembler operates to digitally apply the press sheet template to the page raster data on demand to form a press sheet assembly.

In one embodiment, the print drive also includes a generator of rasterized geometrical depiction of prepress imposition data, which is connected to the digital press sheet assembler. The digital press sheet assembler digitally combines the rasterized geometrical depiction of prepress imposition data with the press sheet template. In one embodiment, the geometrical depiction data is rule-up lines.

In one embodiment, the data store is a storage device such as DRAM memory, a hard disk or some combination. In another embodiment, the print drive may also include a template selector for selecting the stored press sheet templates from the storage device. In yet another embodiment, the print drive further includes an output subsystem for transmitting the press sheet assembly to a destination device.

In general, in still another aspect, the invention features an imaging system consisting of a page generator for creating at least one of the page files of a print job, an imposition generator for creating prepress imposition data, a first raster image processor for processing the page file to produce page raster data, a second raster image processor for processing prepress imposition data to produce a press sheet template, and a print drive in communication with the first raster image processor and the second raster image processor. In one embodiment, the first raster image processor and the second raster image processor are the same raster image processor.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 5 is a list of page imposition parameters;

FIG. 7 is a list of press sheet imposition parameters;

DESCRIPTION

Figure 2:
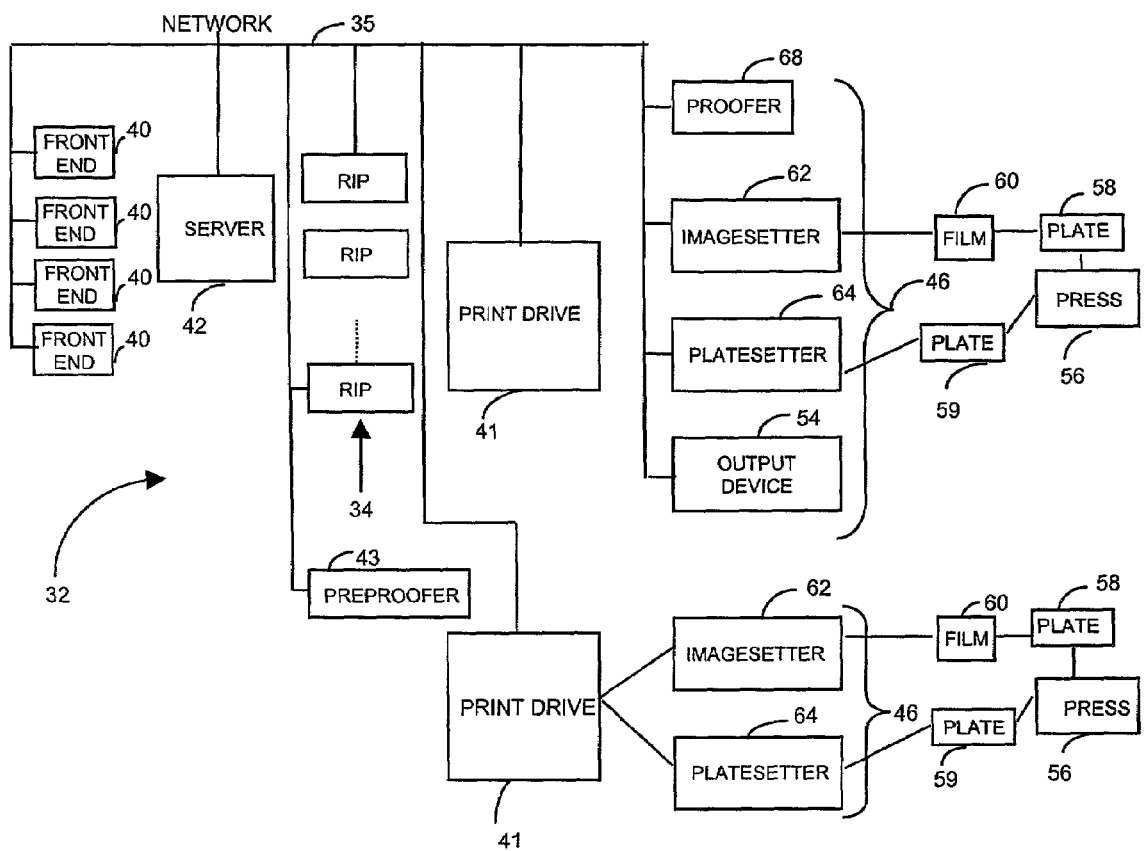
FIG. 2 is an embodiment of a prepress imaging system according to the present invention.

Referring to FIG. 2, a prepress system 32 for processing print jobs prior to printing, includes one or more front ends 40 connected to computer network 35. The network 35 can be any of the various types of commercially available computer networks, but must be of sufficient capacity to handle the print job traffic generated by the prepress system. In one embodiment, the network is an ethernet network, including a 100baseT switch and appropriate connections between the networked components and the switch.

The front ends 40 are used for creating, editing, or otherwise preparing image data for printing. Image data may include graphics, text, or a combination thereof. Both color and black and white images are prepared on the front end 40 for processing by the prepress system and eventual reproduction by a printing press 56 using a printing plate 58. The front ends 40 can be commercially available computers, for example including, but not limited to, Intel-based personal computers, or computers manufactured by Apple Computer™, Sun Microsystems™, or Silicon Graphics™, having operating systems such as Windows NT™, Mac OS™, or a version of UNIX™. The front ends 40 have imaging application software such as commercially available Quark Express™ or Adobe PageMaker™. The imaging application software produces page images coded in a page description language. The front ends 40 also have imposition software, such as Scenic Soft Preps™ or Ultimate Technologies' Impostrip™. Other similar software is also useful. In a preferred embodiment of the invention, the imposition software is Scenic Soft Preps™. The imposition software generates prepress imposition data used to create an imposition layout.

The front ends 40 can output page images and prepress imposition data directly to raster image processors 34 ("RIP"). The front ends 40 can also output page images to an image server 42.

In one embodiment, the image server 42 receives page images from the front ends 40 and stores them on the system. The image server 42 can queue jobs for immediate transmission to one of the RIPs 34 when a RIP 34 becomes available. The image server 42 can also store page images from the front ends 40 for later processing by RIPs 34. The image server 42 helps improve workflow efficiency by allowing front end users to output their jobs even if all of the RIPs 34 are busy. By queuing a job for the RIP 34 on the image server 42, the RIPs 34 can be kept continuously busy.

The RIPs 34 may be software RIPs operating on a computer system, which may be one of the front ends 40, or other commercially available computer system including, but not limited to, Intel-based personal computers, or computers manufactured by Apple Computer™, Sun Microsystems™, or Silicon Graphics™, having operating systems including Windows NT™, Mac OS™, or a version of UNIX™. An example of such a software RIP is the Agfa Apogee PDF RIP™ software available from Agfa Corporation of Wilmington, Mass. The RIP 34 may also be dedicated hardware RIPs. Each RIP 34 has a software and/or hardware RIP module for some RIP functions such as screening, trapping, imposition, page or image combination, color separating, or, color management of page image data.

Each of the RIPs 34 includes an input network interface module over which page images coded in a page description language or other types of input image files are received from the front ends 40 or the image server 42. Each RIP 34 typically appears on the network and can be accessed by any front end 40 or the image server 42 or other computer system on the network 35. The input network interface module may also serve as an output network interface module so that a single network interface connection connects each RIP 34 to the network 35. In another embodiment, a separate network connection connects each RIP 34 to a print drive 41 to maximize system performance.

A print drive 41 receives raster data from RIPs 34, and stores the rasterized page images for reproduction by output devices 46. The print drive 41 may be connected to the RIPs 34 and the output devices 46 directly, or via the network 35. As described further below, in addition to storing rasterized page images, the print drive is capable of combining portions of an image into one image. For example, the print drive can combine page images into flats. The print drive can combine page images into flats on demand as the flat is transmitted to the output device or when display of raster data is requested.

In one embodiment, print drive 41 is implemented as one or more software modules operating on a standard computer platform configured for efficient print drive functions. Typically, this would be a high-performance computer, with sufficient memory, disk space, and processing power to perform the functions described herein. In one embodiment, the print drive 41 is implemented as a server-class PC with dual 550 MHz Intel PENTIUM III processors, multiple high-speed disk drives and 256 MB of memory, but depending on the processing requirements and performance desired, machines with greater or lesser capabilities can be used. The print drive hardware may also include a number of interface boards or modules including, for example, a fast network interface or a hardware connection to an output device 46 such as an imagesetter 62, platesetter 64, or direct on-press imaging system. In other embodiments, the print drive can include other special-purpose hardware.

The output devices 46 may include any output devices which are used in a prepress system or in a printing environment, such as a printer, a print engine, a proofer, a filmsetter, an imagesetter, a platesetter, a computer-to-plate system or a direct on-press imaging system. The final output devices 46 such as the imagesetter and platesetter generate raster image data representing halftone or otherwise screened images for eventual transfer onto a film 60 or a printing plate 58 for reproduction by a printing press 56. Another example of the final output device 46 is a direct on-press imaging system which enables processing and reproduction of raster image data directly by the press.

A proofer 68 creates images representative of the printed material, thereby allowing a system operator or a customer to verify correctness of the imposition layout and color reproduction of the final product while avoiding the costs of actually making printing plates and setting up a high-speed, high-volume, printing press to produce an example of an intended image. These images may often require several corrections and be reproduced several times to satisfy customer requirements. Examples of proofers are the AgfaJet Sherpa™ proofers, available from Agfa Corporation of Wilmington, Mass.

An imagesetter 62 images on photosensitive film or paper. The photosensitive film 60 is used to make at least one plate 58. A plate is used on press 56 to print one color of an image. On a black and white image, only one color, black, may be necessary. For a color image, generally at least 3 colors, cyan, magenta, and yellow, and often a fourth color, black, are used. Often one or more spot colors are used as well. The imagesetter 62 images a separation for each color onto a film, and each separation is used to make a plate 58. The plates are then used on the press to print high quality printed material, often in large quantities. Examples of imagesetters are the Agfa Selectset Avantra™ Series or the Agfa Phoenix™ Series of imagesetters, all available from Agfa Corporation of Wilmington, Mass.

A platesetter 64 images directly onto a plate 59, without the use of film 60. By use of the platesetter 64, the step of creating a plate 58 by using film 60 is eliminated. This can improve the workflow, because it eliminates a step, and also eliminates the material cost of film 60. Examples of platesetters are the Agfa Galileo™ platesetter and the Agfa Xcalibur™ digital platesetting system, available from Agfa Corporation of Wilmington, Mass.

Figure 1:
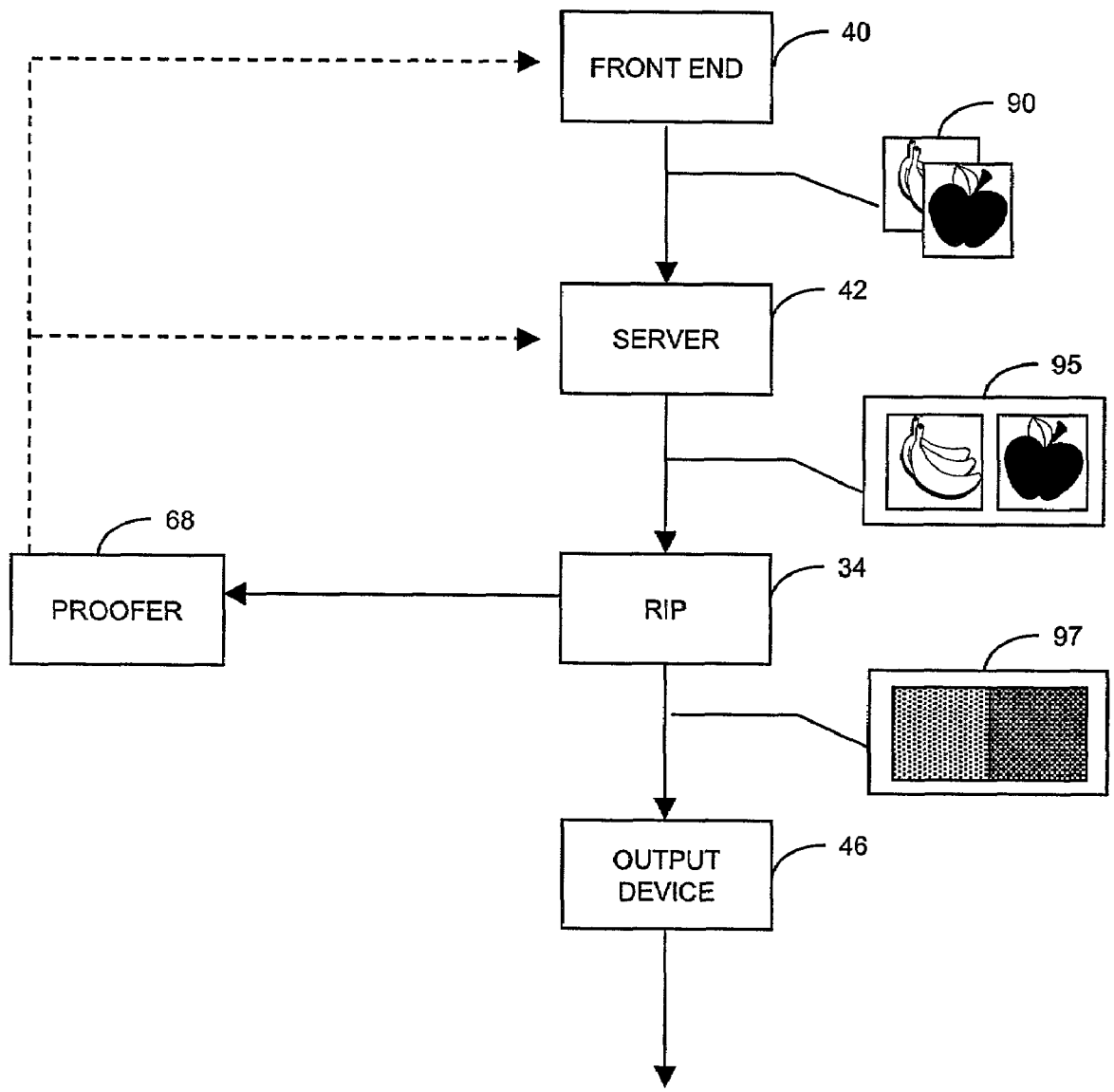
FIG. 1 is a flowchart of the flat-based workflow of a print job in the prior art.
Figure 3:
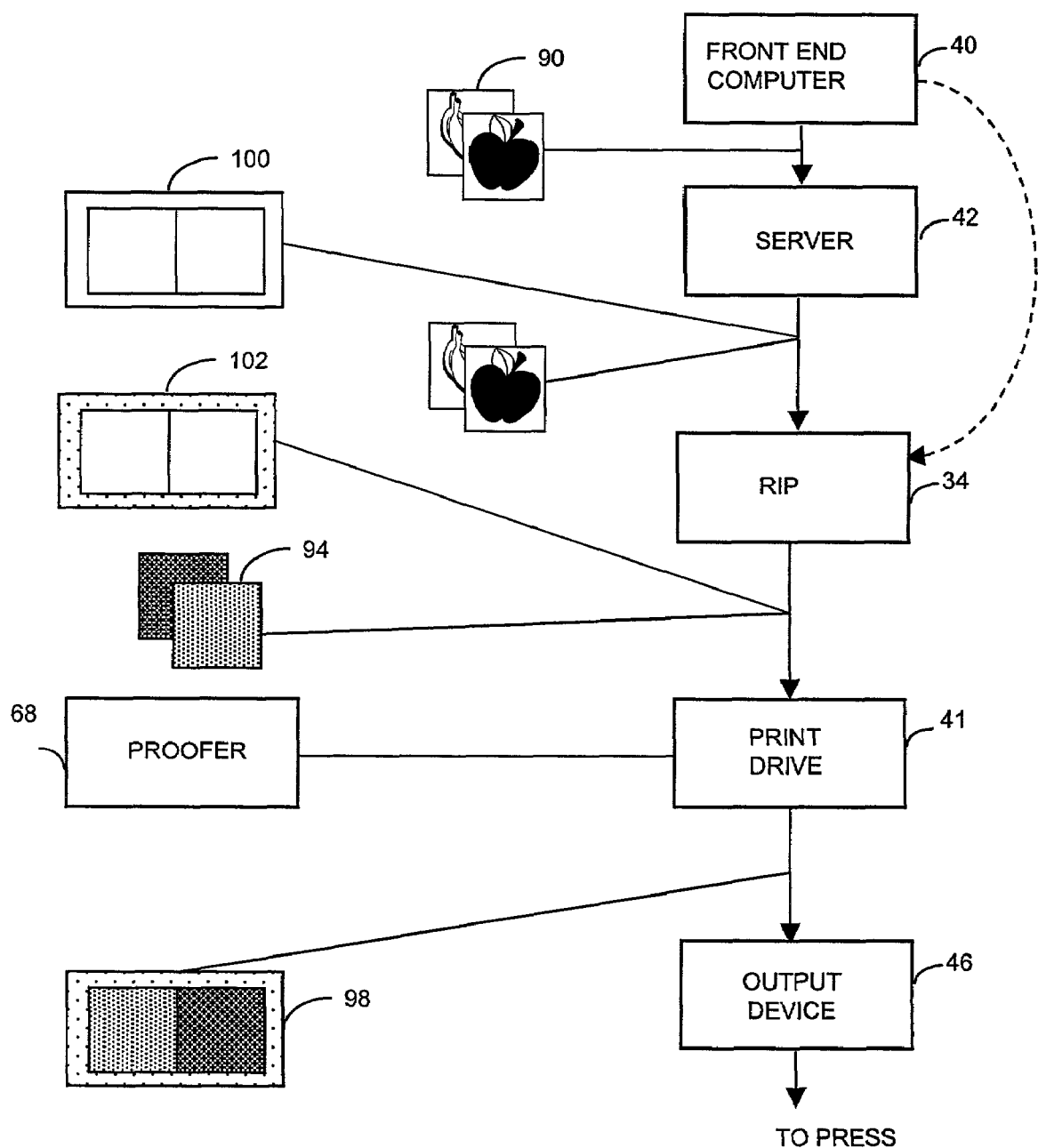
FIG. 3 is a flowchart of the page-based workflow of a print job in the prepress imaging system of FIG. 2.

Referring to FIG. 3, the workflow of the prepress system of FIG. 1 in an embodiment of the invention begins with the front end 40. Page images 90 of a print job are designed using imaging software and are coded in a page description language, such as PostScript or PDF. Each page image 90 may include text, graphics, or some combination derived from the same or different sources. Each page image 90 may be the text and/or graphics that will ultimately be printed on one page of paper, or may be a portion thereof, or may be the text and/or graphics that will ultimately be printed on multiple pages. Here, page image 90 refers simply to a portion of the flat, which may be include some portion of one or more images, text, some combination of portions of images or text. In a preferred embodiment, each page image is the text, graphics, or some combination associated with one printed page, and there are, for example, eight page images 90 each associated with one page of an 8-up flat.

The front end 40 may queue the page images 90 for processing by sending a print job to the image server 42. Alternatively, the front end 40 may output the print job directly to a RIP 34.

A set of page images 90 may be associated with a single print job by creating a job description file. For example, print job information may be specified with a job ticket editor that provides a user interface and allows for creation, editing, and tracking of job information. Print job information may be stored in a standard format, for example using Adobe's Portable Job Tickets Format (PJTF), or the Job Description File (JDF) format, or another format.

The page images 90 are transmitted to the RIP 34 by either the front end 40 or the image server 42, and then processed by the RIP 34 to generate raster image 94 of each page 90. The RIP 34 then outputs the raster data that results from RIP processing to the print drive 41. The print drive 41 stores the raster image 94 of each page 90 until it is ready to be reproduced on an output device 46.

The imposition template 100 is generated using imposition application software. The imposition template 100, coded in a page description language, contains various information useful for placement of page images, including position, sequencing, orientation, bleeds, and offset data relative to the press sheet for each page image 90 to be positioned on the press sheet, as well as position data of the press sheet relative to the type of the output device 46 and media used on the press 56. For example, separate imposition templates defining imposition schemes for the proofer 68 and the imagesetter 62 may be generated for the same print job. The imposition template 100 may be generated on the front end 40 or the image server 42 as a part of the print job after the page images 90 are created. Alternatively, the imposition template may also be generated in advance and independently of the print job. The imposition template 100 is transmitted to the RIP 34 by either the front end 40 or the image server 42, and then processed by the RIP 34 to generate a press sheet template 102, which includes a set of imposition parameters used to create press sheet assembly 98 and a raster image of the imposition template 100. The RIP 34 extracts such imposition data as the position, sequencing, orientation, bleeds, and offset data relative to the press sheet for each page image 90 to be positioned on the press sheet, as well as position data of the press sheet relative to the type of the output device 46 and media used on the press 56, and generates the image of the press sheet without page images 90. The RIP 34 then transmits the press sheet template 102 and the imposition data to the print drive 41. In one embodiment, a preprocessor is included in the RIP to extract imposition data and communicate it to the print drive. Alternatively, in other embodiments, the press sheet template 102 may be generated and transmitted directly to the print drive 41 by the user, by a third party, by another device, and so on. The press sheet template 102 may then be stored on the print drive 41.

The press sheet template 102 is then combined on demand with the raster images 94 to form a press sheet assembly 98. Assembling the press sheet after the page images 90 are processed by the RIP 34 permits submitting the page images 90 for processing by the RIP before the layout of the press sheet is completed. It also allows adding additional pages to the layout after the raster images 94 of these pages become available. The imposition parameters contained in the press sheet template 102 provide for accurate placement of the raster images 94 on the press sheet assembly 98. The press sheet assembly is formed on demand, at the time of imaging or display of the press sheet without first creating and storing a whole combined press sheet raster image file. The formation takes place "on the fly" at output or display time. Assembling the press sheet at the post-RIP stage increases efficiency and productivity of the prepress imaging system by substantially reducing RIP-processing time and ensuring constant engagement of the output devices and printing press.

The imposition parameters of the press sheet template 102 may be modified, if necessary, by the system operator at any time prior to the output or display. In one embodiment, a user interface is provided that allows a system operator to view and modify the imposition parameters. In another embodiment, the imposition parameters are stored in a text file that can be accessed by a text editor program or a word processor, and can be edited manually using such a software program.

In one embodiment, when the press sheet assembly 98 is ready to be reproduced, the print drive 41 transmits the press sheet assembly 98 to an output device. For example, the print drive 41 may transmit the press sheet assembly 90 to the proofer 68. If, in such an example, no errors in the imposition scheme or color reproduction have been detected from the proofer output, the press sheet assembly 98 can be imaged to the output device 46. In one embodiment of the present invention, the print drive 41 transmits raster images 94 to the proofer 68 separately so that the raster image of each page image 90 can be inspected individually.

If a correction or last-minute design change to the raster image 94 or the press sheet template 102 is desired, the corresponding page image 90 or the imposition template 100 can be modified and transmitted to the RIP 34 for processing. Then the raster image 94 of the modified page image 90 or the modified press sheet template 102 is transmitted to the print drive 41 where the press sheet assembly is formed and submitted to the proofer 68, and/or output device 46. Thus, the present invention offers significant flexibility to make late-stage changes by eliminating the need to have the RIP re-process the entire fully-imposed multi-page press sheet.

The increase of productivity of step-and-repeat print jobs, which entail printing multiple copies of the same image, is particularly significant. In the workflow of such job, an individual image is RIP-processed (including, for example, trapping) and imposed only once, and then transmitted to the print drive 41. At output time the same raster image 94 can be repeatedly positioned on the press sheet according to the specifications in the imposition template. In addition to reducing the RIP-processing time, the present invention ensures that exactly the same halftone dot placement will be applied to each stepped image regardless of output system orientation and image position. The trapping, for example, only needs to be verified on one image, since the raster data for each image is the same.

Figure 4:
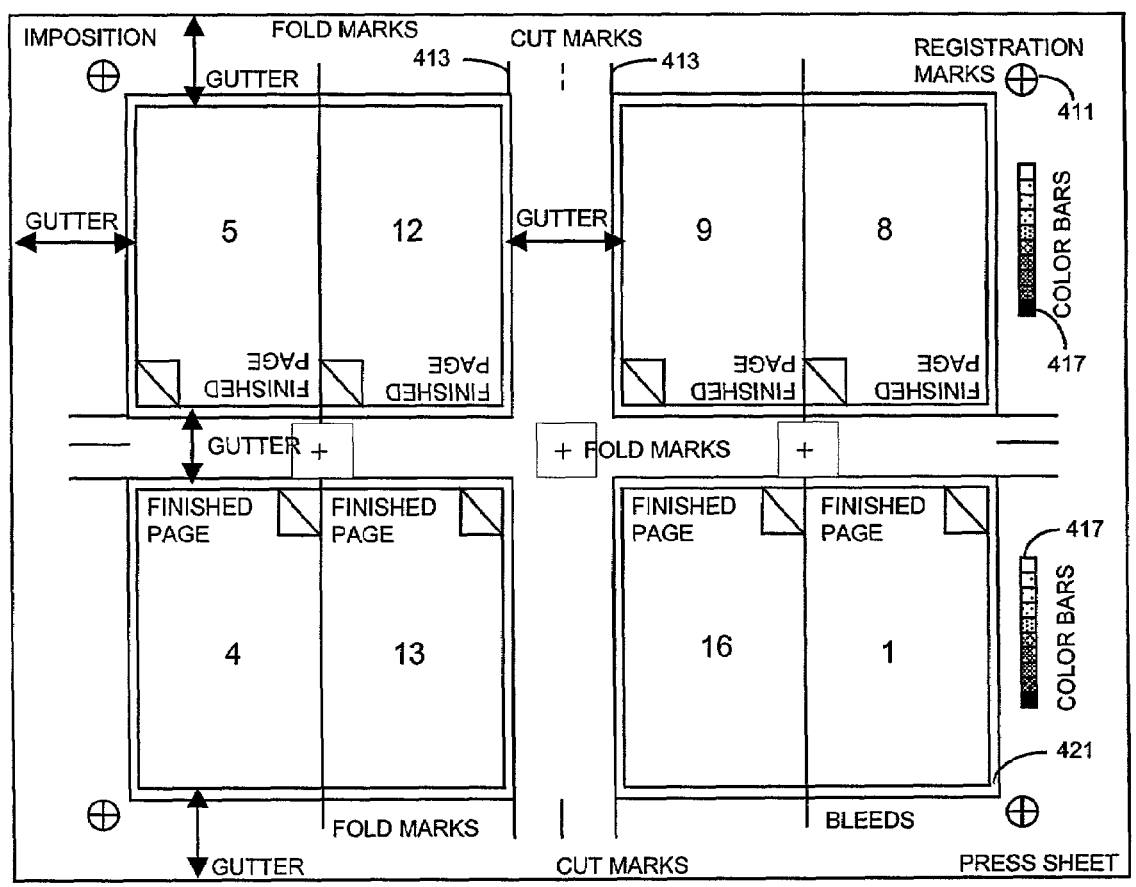
FIG. 4 is a geometrical depiction of press sheet assembly parameters.

Referring to FIG. 4, the geometrical depiction of press sheet assembly parameters is shown. These parameters include position, sequencing, and orientation data for each page 1-16 on the press sheet. They also include information about what part of the raster image of the page is contained in the imposition. The press sheet imposition also includes various marks as shown, including registration marks 411, cut marks 413, fold marks 415, and color bars 417. The press sheet further includes bleed areas 421, referred to as "bleeds," which are areas of the raster image of the page that extend outside of the area that will ultimately be printed on a printed page and so are cut off at printing. The bleeds 421 are provided to allow printing to the edge of the paper while avoiding unprinted edges.

It should be noted that some of the data referenced above is information about where the press sheet is going to be placed relative to the plate. This information can be used to add cut and fold marks, for example, onto the image. This information can also be used, for example, to generate a press sheet image for a different size plate.

Also, as mentioned above, when the press sheet is viewed in the form of an imaged film or on the plate, it may not be easy to determine whether the page has been positioned properly on the press sheet. For example, it may not be easy to determine that the bleed areas extend sufficiently over the cut marks, that is, whether the bleed area extends sufficiently over the printed page. A system operator not having the benefit of the present invention may image a proof image, and attempt to measure and mark the proof image to determine whether the bleed areas extend sufficiently. This can be a time-consuming and error-prone manual process. In one embodiment, it is possible for the print drive to provide additional information to the system operator on the proof image such as geometrical depiction of the imposition data. For example, rule-up lines to clearly indicate the bleed areas can be provided.

Referring to FIG. 5, the list of page imposition parameters includes the page number 510, which is the document page number. The sheet number 511 is the number of the press sheet that the page belongs to. The side 512, that is front or back, of the sheet that the page belongs to is also included. The Left/TopOffset 513, which is the offset of raster edge to finished page (page and raster) is also included. The imaging parameter list also includes the PageWidth/PageHeight 514, which is the size of the finished page to be imposed, excluding bleeds. The BleedLeft/RightOffset 515 are the bleed sizes prior to any image rotation to apply in the X direction (i.e. horizontal). The BleedTop/BottomOffset 516 are the bleed sizes prior to any image rotation to apply in the Y direction (i.e. vertical). The Rotation 517 is the angle of rotation to apply to the page before positioning. The imaging parameter list also includes mirroring 518, which is the mirroring to be applied to the image (if any) before insertion into a press sheet. The imaging parameter list also includes the polarity 519, which is the polarity to be applied to the raster before insertion into the press sheet.

Figure 6:
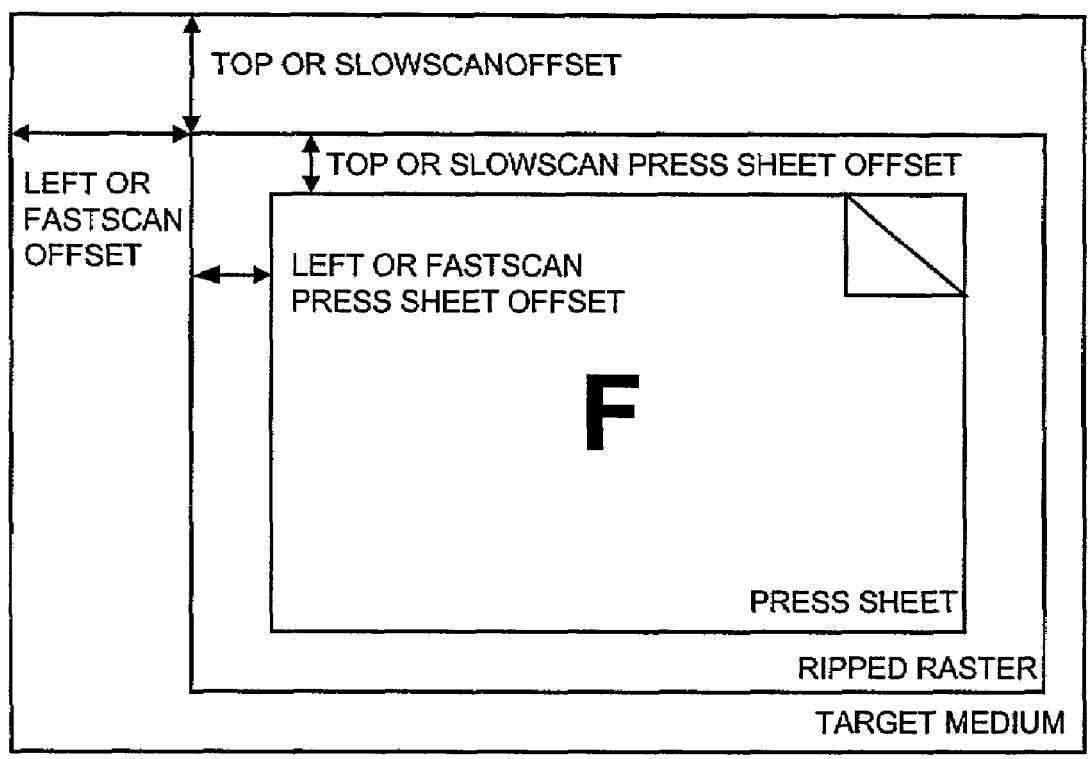
FIG. 6 is a geometrical depiction of press sheet imposition to media.

Referring to FIG. 6, imposition of the print job also requires defining location of the press sheet assembly on target media, i.e. the press plate or film used for making the press plate. To position the press sheet onto the target media, the press sheet size and orientation, offsets and image operations, such as mirroring or negative polarity must be determined. The press sheet to media imposition allows users to select a different target media, such as a proofer, imagesetter or platesetter, without having to re-process the print job by the RIP or change the press sheet assembly imposition. Moreover, in one embodiment, the system operator can easily create a convenient proofing template for every print job, for example, a 2-up press sheet, referred to as a "reader's spread."

Referring to FIG. 7, press sheet parameters define the imposition of the press sheet onto the output device. The list of press sheet parameters includes the job work style 650. The target engine 651 defines the target output device, such as imagesetter or platesetter. The target media 652 defines the type of the target media, such as plate or film, and its size. The target resolution 653 is the resolution used when imaging, measured in dots per inch. The press profile 654 defines the color information and other information for the particular target press. The FastScanOffset 655 defines a raster offset prior to rotation in fast scan direction. The SlowScanOffset 656 is a raster offset prior to rotation in slow scan direction. The PressSheetTopOffset 657 defines a top offset from raster edge to press sheet area. PressSheetLeftOffset 658 defines a left offset from raster edge to press sheet area. The PressSheetHeight 659 and the PressSheetWidth 660 is the height and width of the press sheet used for the print job. Rotation 661 is an angle of rotation used to position the raster. The default value of the Rotation parameter is zero. The Mirroring 662 and Polarity 663 are the resulting mirroring and polarity of the press sheet when imaged.

Figure 8:
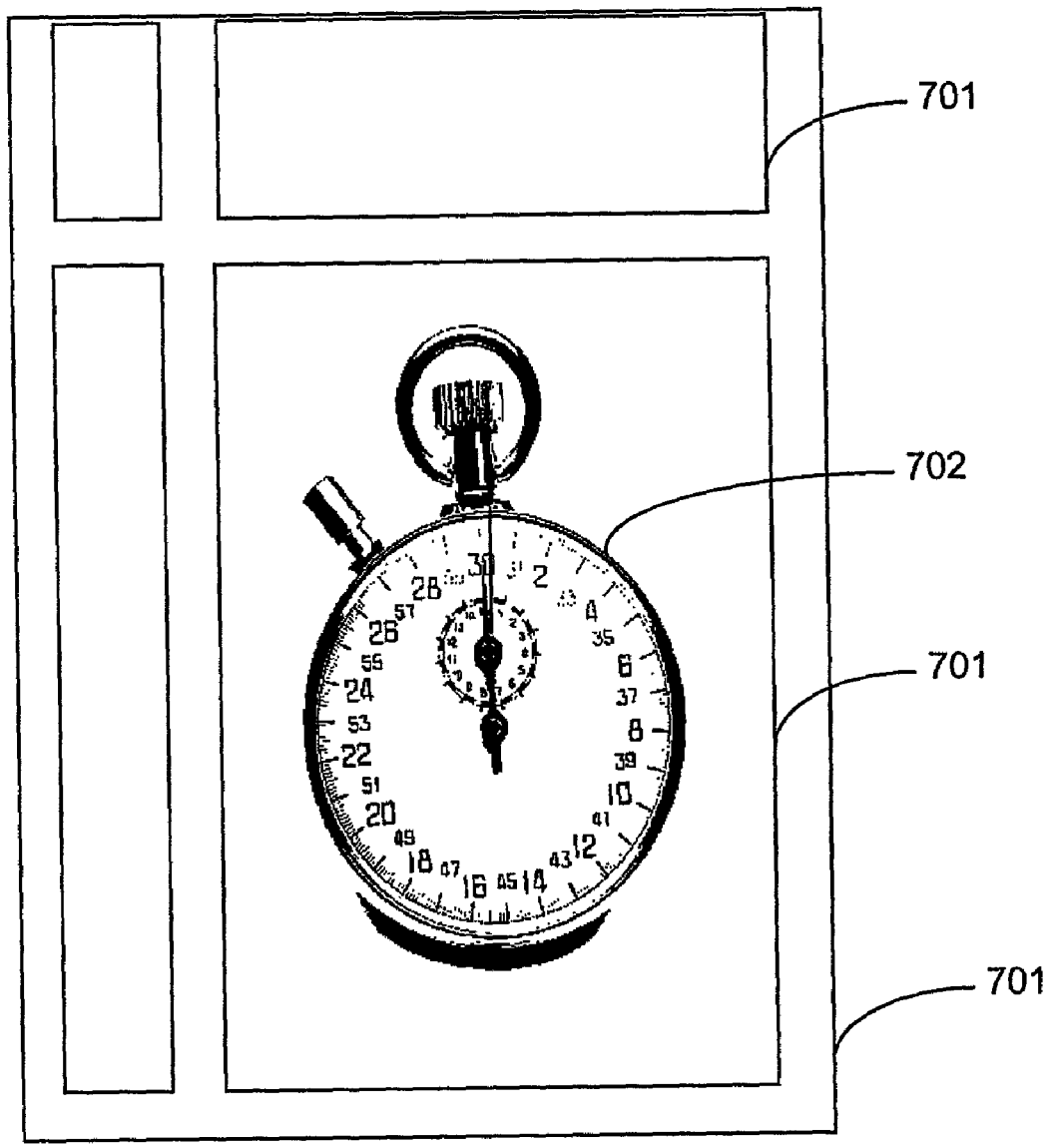
FIG. 8 is a raster image of the press sheet template according to one embodiment of the present invention.

Referring to FIG. 8, in one embodiment, the parameters used to position the page images on the press sheet and the press sheet assembly on the target media are extracted from the imposition template and are used to create geometrical depiction of the imposition template. This depiction includes lines around the page areas 702 and the press sheet areas of the image. After the press sheet assembly is formed on the print drive 41, these lines, termed "rule-ups" 701, are added to the press sheet assembly prior to transmitting it to the proofer 68. The rule-ups 701, which can be printed on the proofs or displayed electronically in a preview application, are then used while examining proofs to verify the image content and placement on the press sheet.

Figure 9:
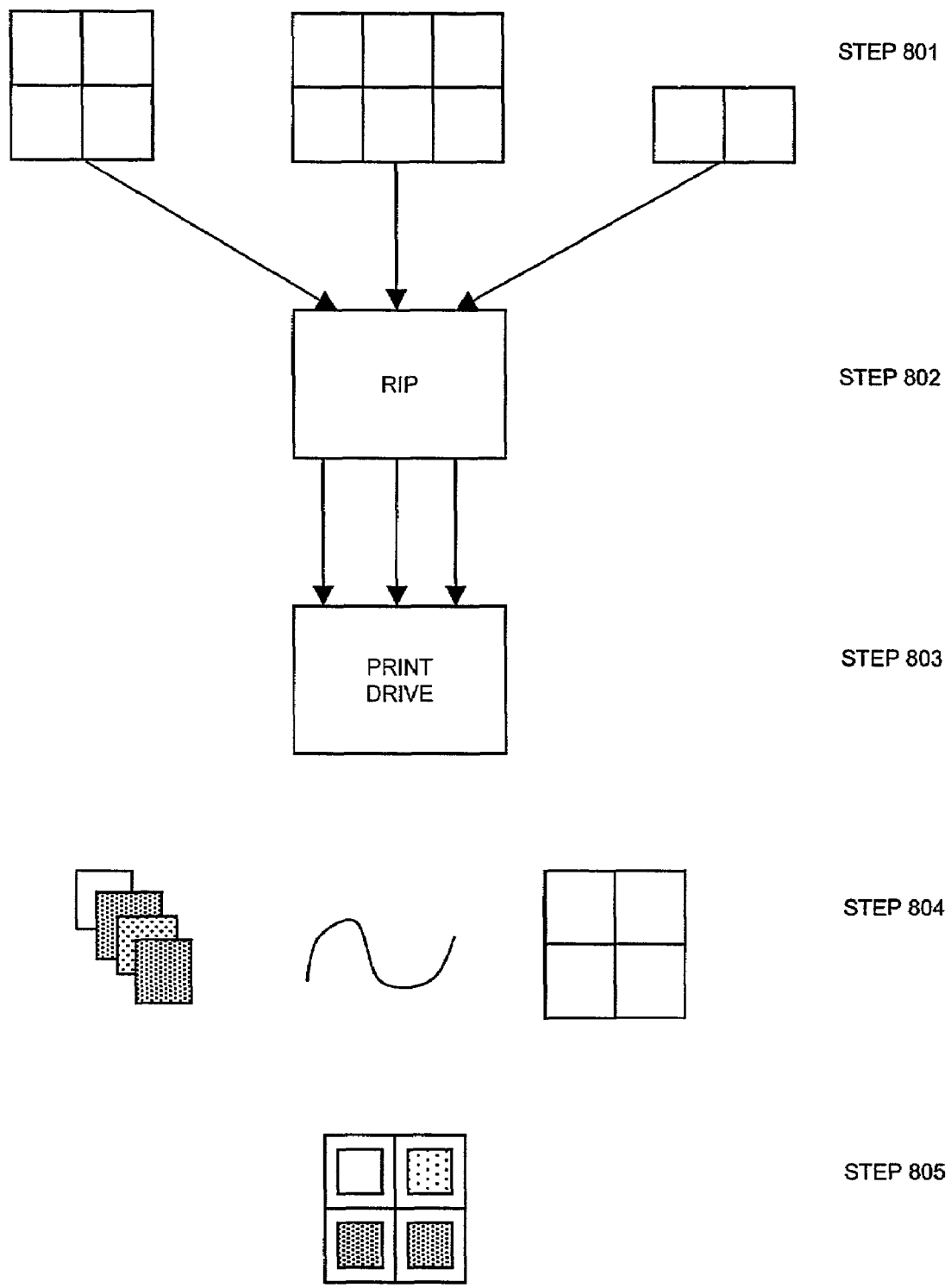
FIG. 9 is a flowchart of one embodiment of the method of the present invention.

Referring to FIG. 9, while forming a press sheet assembly on the print drive is generally efficient, the need to prepare an imposition template for every print job limits the productivity by increasing processing time. The efficiency of the prepress system can be further improved if "master" press sheet templates are stored on the print drive and used repeatedly for print jobs with similar layout parameters and press sheet assembly instructions. In addition, similar print jobs may share the same imposition marks, i.e. cut and fold lines, registration marks, color bars, etc., and the same number and size of finished pages. Furthermore, similar print jobs may be reproduced using the same output device and the same press.

In one embodiment, a number of imposition templates are created for different combinations of imposition data and for different configurations of output devices (STEP 801). The templates can be created using imposition software as described above, or in some other manner. Each template is then RIP-processed (STEP 802) and transmitted to the print drive. The print drive stores the template information (STEP 803).

The stored templates can include standard or typical layouts of one or more flats. For example, the templates can include a typical 4-up flat for 8×10 pages, such as might be typical for a brochure, a typical 2-up flat that is used for proofing (the "reader's spread"), a popular series of 8-up flats for a job including 128 pages of 4×6 size, and so on. The templates may include information for more than one flat, for example for a first flat that contains the first eight pages (in a 8-up) of a typical 16-page layout, and for a second flat that contains the latter eight pages.

Once the page images of a particular print job have been RIP-processed, the template matching the parameters of the print job, for example including a total number pages, page size, position, sequencing, and orientation, cutting and folding requirements, and choice of output device, is selected (STEP 804). The template is applied on demand to the page raster data to form a press sheet assembly (STEP 805).

This embodiment of the invention is particularly suitable for repetitive jobs, for example periodicals that always contain the same number of pages, page size, positioning, sequencing, orientation, and color. Another suitable use of this embodiment is for step-and-repeat jobs described above, where the layout is unchanged but different pages are used for each job.

In another embodiment of the present invention, an imposition template, which is created and RIP-processed in connection with a particular print job, remains permanently associated with an identifier of that print job. This template is stored on the print drive and applies automatically to impose all pages marked by the same print job identifier.

Figure 10:
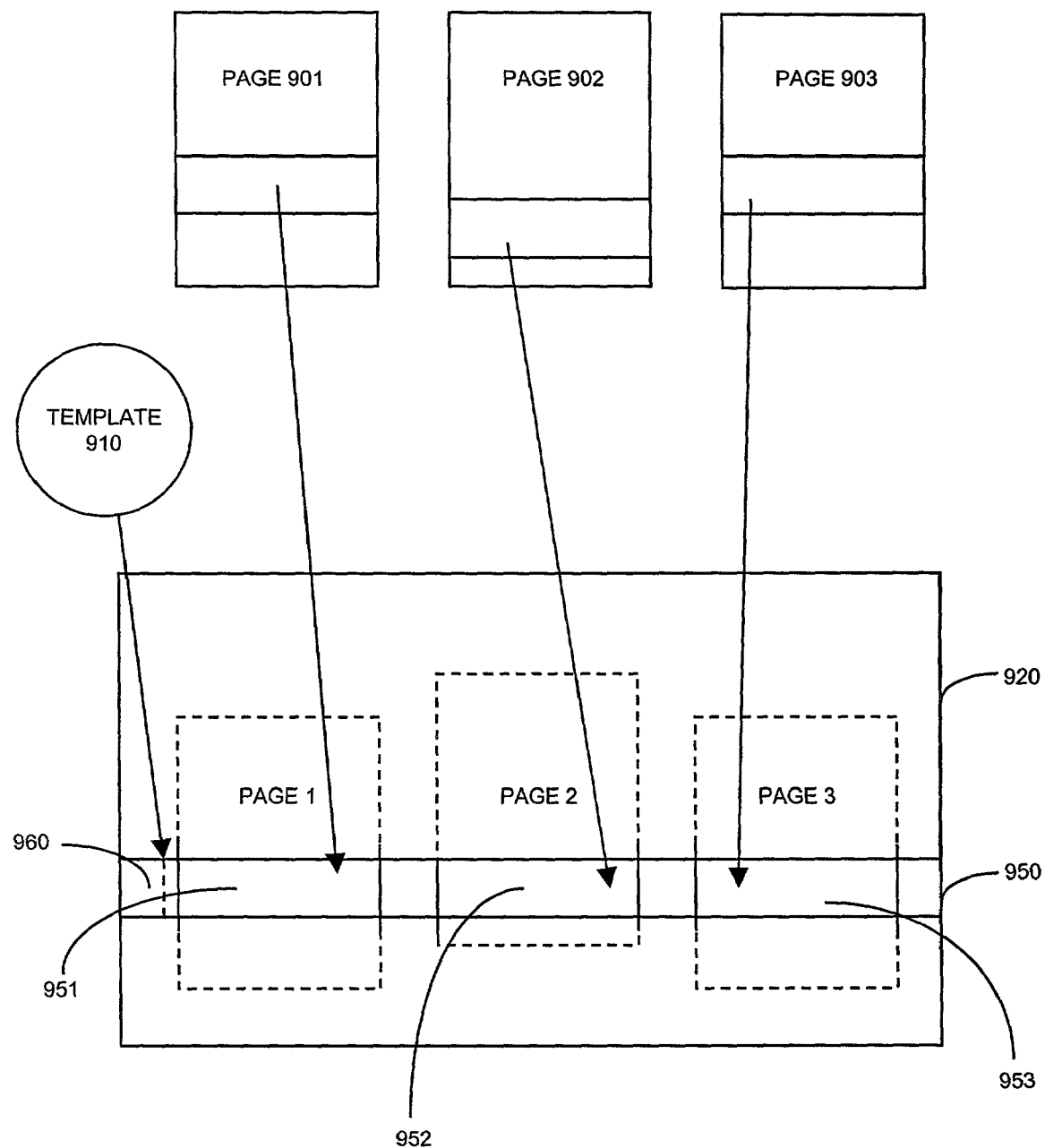
FIG. 10 is a demonstrative example of another embodiment of the method of the present invention.

Referring to FIG. 10, a demonstrative example in which a print drive generates a portion of a press sheet for output to an output device. In this example, the portion of the data is a band to be imaged on an output device. In the press sheet of this example, there are three pages, page 901, page 902, and page 903. At the time of imaging, the print drive extracts information from these pages 901, 902, 903, and composes the band 950 (which preferably is a sufficient number of scanlines to keep the output device continuously busy) for output to the output device. The print drive uses template information 910 to determine where the portions of the pages 901, 902, 903 should be included in the band. The print drive, for example, in the generation of the band shown 950, extracts the portion 951 of page 901 that belongs in the band 950, and extracts the appropriate portion 952 of page 902 and extracts the appropriate portion of page 903. The print drive can also use information from the template 910, to add any marks or other information to the band. In a preferred embodiment, the band 950 of FIG. 10 is formed in memory, at time of output, such that only one or two bands are stored in memory at one time. The entire press sheet 920 is, therefore, not stored as a whole anywhere within the print drive, and is composed only in portions. In this way, the storage needs of the print drive are kept to a minimum, and the flexibility of the system is improved. The press sheet can also be formed for display on a computer monitor, for preview purposes. If the flat is being imaged on a display, the number of scanlines needed for display is extracted and can be written directly to the display memory. Alternatively, the entire flat or a portion of the flat can be generated on demand and stored in a file, for display or later output.

If the press sheet 920 is to be imaged on a proofer, the print drive, in one embodiment, composes the press sheet for the output device, and then performs the necessary transformations to output the image onto the proofer. Such transformations may include descreening and combining different color rasters of the same page 901, 902, 903 into contone data. See, for example, co-pending U.S. patent application Ser. No. 09/090,072 to Azima et al., filed Jun. 3, 1998, incorporated herein by reference, for a description of the transformations that may be used to process data rasterized for an output device to a proofer. The print drive can use template information to add additional marks to the band 950, for example, rule-ups that clearly show the bleed areas, and instantly show the operator whether the pages have been placed appropriately on the press sheet.

Figure 11:
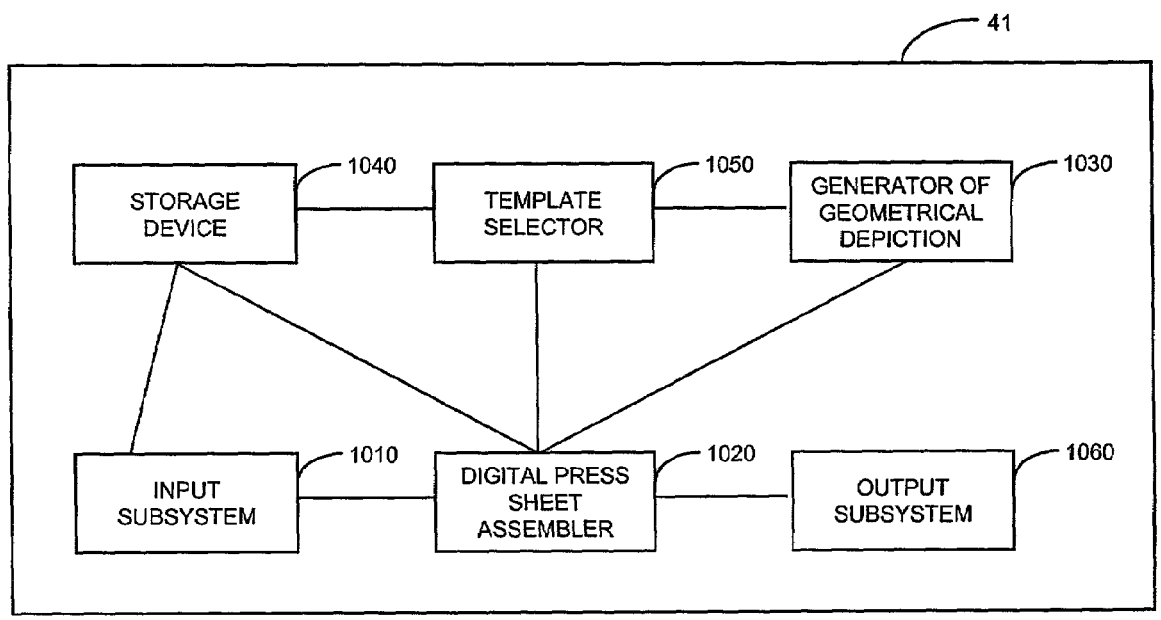
FIG. 11 is a more detailed embodiment of a print drive according to an embodiment of the invention.

Referring to FIG. 11, a print drive 41 of the present invention includes an input subsystem 1010 for receiving page raster data of at least one of the pages of a print job. In one embodiment, the input subsystem can be implemented with networking hardware and software that allows the print drive to receive template information and raster data.

The print drive 41 further includes a digital press sheet assembler 1020 connected to the input subsystem. In one embodiment, the assembler 1020 is implemented by software modules that perform the functionality described herein. In another embodiement, the assembler 1020 is implemented with some combination of hardware and software.

The print drive 41 may also include a generator of rasterized geometrical depiction of prepress imposition data 1030. This generator can also be implemented with software modules. This generator is able to convert prepress imposition data into geometrical depictions of the appropriate size and resolution, and in the appropriate location, for each flat.

The print drive 41 may further include a storage device 1040 connected to the digital press sheet assembler 1020. The storage device 1040 is capable of storing a plurality of the press sheet templates. In one embodiment, the storage device 1040 is a combination of hardware, such as a hard disk, RAM memory, or some combination, and software for providing data storage functions.

The print drive 41 may further include a template selector 1050 that is used to select stored templates. In one embodiment, the selector is implemented with software modules. A portion of the selector 1050 may be a user interface running on the same or a different computer as the print drive.

The print drive 41 may also include an output subsystem 1060 for transmitting data to an output device, a video display, and so on. The output device 1060 may be some combination of a network device (possibly even the same network device as the input subsystem) and software to interface with the network device. The output device 1060 may include hardware to interface directly with an output device.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A digital prepress system for preparing and transferring an image to a printing plate to be used on a printing press, the system comprising:

- a page generator for creating two or more pages to be printed onto the printing plate;
- an imposition generator comprising application software for creating original imposition data relating to the positioning of the two or more pages onto both the printing plate and the printing press;
- a raster image processor for receiving and processing said two or more pages to produce independent page raster data for each said page; and
- a computer controller comprising:
- an input subsystem for receiving the original imposition data and the independent page raster data, and for selectively
- (a) replacing a predetermined portion of said original imposition data with updated imposition data received from the imposition generator, or
- (b) replacing a predetermined page of said independent page raster data with updated page raster data received from the raster image processor; and
- a digital press sheet assembler for digitally combining the original imposition data with said replacement imposition data and combining the independent page raster data with said replacement raster data to form the image to be transferred to the printing plate; and
- an output subsystem working in tandem with the press sheet assembler to transfer prepared portions of the image to a selected output device as the press sheet assembler prepares subsequent portions of the image; the selected output device comprising a filmsetter, a platesetter, a high resolution color proofer, a large format high resolution color printer or a digital storage medium.

2. The system of claim 1, wherein the image is simultaneously being transferred to the printing plate while the digital press sheet assembler is combining said imposition raster data and said page raster data of the image being transferred.

* * * * *